US009135903B2

(12) United States Patent
Okamoto

(10) Patent No.: US 9,135,903 B2
(45) Date of Patent: Sep. 15, 2015

(54) ELECTRONIC KEYBOARD INSTRUMENT

(71) Applicant: KABUSHIKI KAISHA KAWAI GAKKI SEISAKUSHO, Hamamatsu-shi, Shizuoka (JP)

(72) Inventor: Seiji Okamoto, Hamamatsu (JP)

(73) Assignee: KABUSHIKI KAISHA KAWAI GAKKI SEISAKUSH O, Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/383,765

(22) PCT Filed: Feb. 19, 2013

(86) PCT No.: PCT/JP2013/053928
§ 371 (c)(1),
(2) Date: Sep. 8, 2014

(87) PCT Pub. No.: WO2013/145934
PCT Pub. Date: Oct. 3, 2013

(65) Prior Publication Data

US 2015/0128791 A1 May 14, 2015

(30) Foreign Application Priority Data

Mar. 29, 2012 (JP) ................................ 2012-077520

(51) Int. Cl.
*G01P 3/00* (2006.01)
*G10H 7/00* (2006.01)
*G10H 1/34* (2006.01)

(52) U.S. Cl.
CPC ......... *G10H 1/346* (2013.01); *G10H 2220/271* (2013.01)

(58) Field of Classification Search
USPC .................................................... 84/626, 662
See application file for complete search history.

(56) References Cited

U.S. PATENT DOCUMENTS 6,245,985 B1 6/2001 Sasaki et al.

FOREIGN PATENT DOCUMENTS

| | | | |
|---|---|---|---|
| JP | 63-180897 | U | 11/1988 |
| JP | 63-271498 | A | 11/1988 |
| JP | 7-114379 | A | 5/1995 |
| JP | 2000-194364 | A | 7/2000 |

OTHER PUBLICATIONS

International Search Report for PCT/JP2013/053928 mailed on May 14, 2013.
Written Opinion of the International Searching Authority for PCT/JP2013/053928 mailed on May 14, 2013.
International Preliminary Report on Patentability dated Oct. 9, 2014, issued in PCT/JP2013/053928 (Forms PCT/IB/338, PCT/IB/373 and PCT/ISA/237).

*Primary Examiner* — Jeffrey Donels
(74) *Attorney, Agent, or Firm* — Birch, Stewart, Kolasch & Birch, LLP

(57) ABSTRACT

When a key depression speed and a key release speed of a key is to be detected based on a value of a counter (44) which accumulates a value every time the key passes through key switches (SW1, SW2), a number of digits of data indicating the key depression speed, a unit of the data being a bit and a number of digits of data indicating the key release speed, a unit of the data being a bit, are made the same.

4 Claims, 9 Drawing Sheets

ELECTRONIC KEYBOARD INSTRUMENT

TECHNICAL FIELD

The present invention relates to an electronic keyboard instrument, and relates particularly to a technique suitable to be used to detect a key depression speed and a key release speed.

BACKGROUND ART

An electronic piano generally detects existence/absence of a key operation, a key depression speed, and a key release speed by a key switch provided in each key. The electronic piano controls a volume and a tone in correspondence with the detected key depression speed and key release speed. By such control, it becomes possible to change the volume and the tone corresponding to key touch.

Further, as a key switch, two key switches constituted to turn on sequentially by two key strokes of short and long strokes are generally used. When such two key switches are used, a time difference between two key switches turning on is counted by a counter and a key speed is detected (see Patent Literature 1).

CITATION LIST

Patent Literature

Patent Literature 1: Japanese Patent Publication Laid-open No. Hei 7-114379

SUMMARY OF INVENTION

Technical Problem

As describe above, a conventional electronic piano controls a volume and a tone in correspondence with a key speed detected by a key switch. Thus, at a time of key depression, a comparatively fast speed range is a dynamic range, and at a time of key release, a comparatively slow speed range is a dynamic range.

Here, it is considered to carry out detection of two kinds of speeds (a key depression speed and a key release speed) having different dynamic ranges by one kind of counter. However, if a scale of the counter is set to suit detection of the key release speed having a large dynamic range in order to cover both dynamic ranges of the key depression speed and key release speed, there are problems that not only the scale of the counter becomes large but also a circuit scale in its peripheral portion becomes large.

The present invention is made in view of such a problem, and its object is to provide an electronic keyboard instrument capable of performing detection of a key release speed also by a circuit scale as small as necessary for detection of a key depressing speed only.

Solution to Problem

An electronic keyboard instrument of the present invention has: a plurality of keys; a plurality of key switches, at least two of the plurality of key switches provided per each of the plurality of keys; a counter accumulating a value in correspondence with input of a signal in a period including at least respective periods of a key depression speed detection period being a period determined in correspondence with a timing at which the key is detected by the key switch corresponding to the key, the period being a period for detecting a key depression speed of the key, and a key release speed detection period being a period determined in correspondence with a timing at which the key is detected by the key switch corresponding to the key, the period being a period for detecting a key release speed of the key; a key speed detection section performing detecting the key depression speed of the key based on a cumulative value of the counter in the key depression speed detection period and detecting the key release speed of the key based on a cumulative value of the counter in the key release speed detection period; and a sound generation control section controlling at least either one of a volume and a tone of a musical sound to generate, in correspondence with the key depression speed and the key release speed detected by the key speed detection section, wherein a maximum value of the key release speed detection period is longer than a maximum value of the key depression speed detection period, and wherein the key speed detection section makes a resolution of the key release speed lower than a resolution of the key depression speed so that a number of digits of data indicating the key depression speed, a unit of the data being a bit, and a number of digits of data indicating the key release speed, a unit of the data being a bit, become the same.

Advantageous Effects of Invention

According to the present invention, it is possible to perform not only detection of a key depression speed but also detection of a key release speed by a circuit scale as small as necessary for detection of the key depression speed only.

DESCRIPTION OF EMBODIMENTS

Hereinafter, embodiments of the present invention will be described with reference to the drawings.

Figure 1:
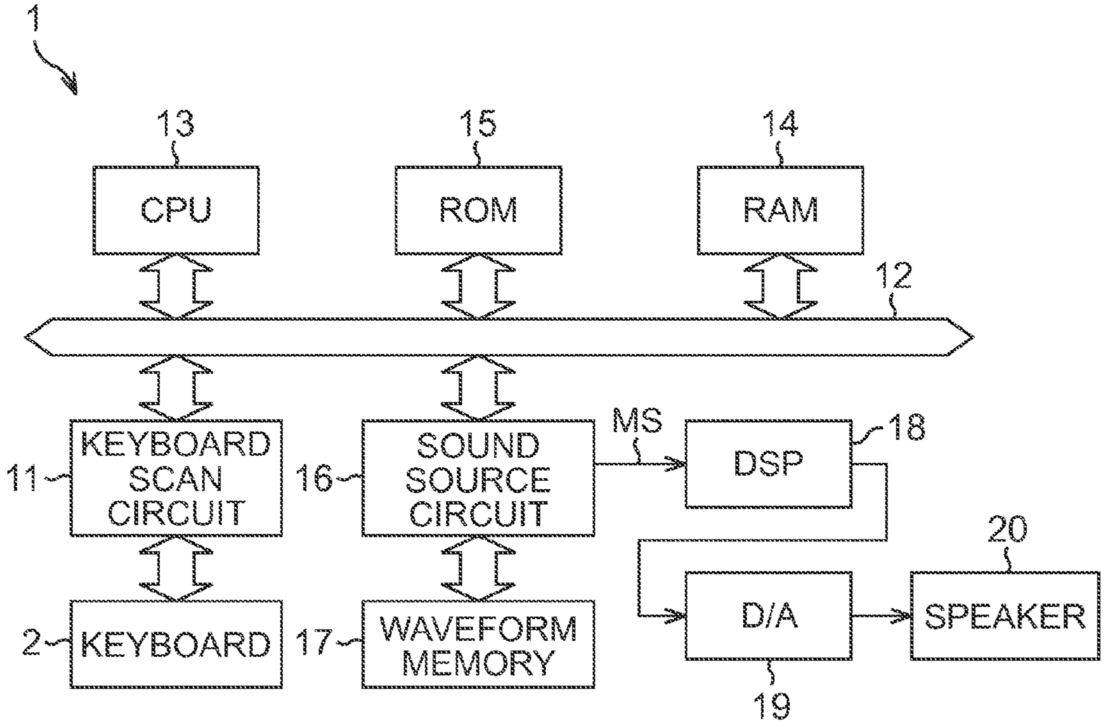
FIG. 1 shows an embodiment of the present invention, and is a block diagram showing a configuration example of an electronic piano.
Figure 2:
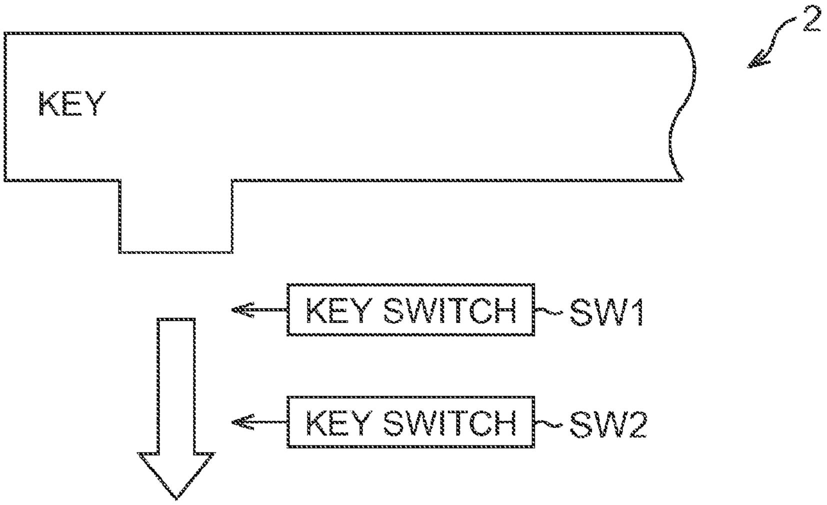
FIG. 2 shows an embodiment of the present invention, and is a diagram showing an example of a positional relationship between a key and a key switch.

FIG. 1 is a diagram showing an example of a circuit configuration of an electronic piano 1 to which an electronic keyboard instrument is applied. FIG. 2 is a diagram showing an example of a positional relationship between a key and a key switch in a keyboard of the electronic piano 1. A keyboard 2 of the electronic piano 1 has a plurality of keys and key switches. In the electronic piano 1 of the present embodiment, at a time of key depression and at a time of key release of each key, a time the key takes to pass through a predetermined zone of an operating range of the keyboard 2 is counted and a key speed is obtained from that count value. When two key switches are installed to measure the key speed, the respective key switches are referred to as SW1 and SW2. Further, turning on of the key switch is represented by ON, while turning off of the key switch is represented by OFF.

A timing of changing from {SW1=OFF, SW2=OFF} to {SW1=ON, SW2=OFF} is a speed counting start time of the key depression time.

A timing of changing from {SW1=ON, SW2=OFF} to {SW1=ON, SW2=ON} is a speed counting end time of the key depression time.

A timing of changing from {SW1=ON, SW2=ON} to {SW1=ON, SW2=OFF] is a speed counting start time of the key release time.

A timing of changing from {SW1=ON, SW2=OFF} to SW1=OFF, SW2=OFF) is a speed counting end time of the key release time.

Though an electronic piano to which three or more keys are installed also exists, detection of the key speed is carried out basically between two points. Therefore, detection of a key speed in a case where three or more key switches are installed is only combination of detection of a key speed of a case where two key switches are installed. Thus, here, detailed explanation of a method for detecting the key speed in the case where three or more key switches are installed will be omitted.

As shown in FIG. 1 and FIG. 2, in the electronic piano 1 of the present embodiment, detection signals of the two key switches SW1, SW2 from the keyboard 2 are inputted to a keyboard scan circuit 11. In addition to ON/OFF information of the keyboard 2 and a note number, states of two key switches SW1, SW2 are continuously detected. The ON/OFF information of the keyboard 2, the note number, data indicating states of the two key switches SW1, SW2 are sent from the keyboard scan circuit 11 to a CPU 13 via a system bus 12, as data indicating a key depression states or data indicating a key release state.

A RAM 14 temporarily stores status information indicating an operating state of the electronic piano 1 and a judgment result of a state of the key (a key depression state and a key release state). The RAM 14 is used as a working area of the CPU 13. A ROM 15 stores a control program executed in the CPU 13 and fixed data used for computation carried out in the CPU 13. The ROM 15 stores a velocity table. Other than the above, the ROM 15 also stores a musical sound output level table and the like used for determination of an output level of a musical sound to generate, based on a velocity determined by using the velocity table. These RAM 14 and ROM 15 are accessed by the CPU 13 via the system bus 12.

The CPU 13 controls each section of the electronic piano 1. The CPU 13 computes a content of a musical sound to generate, in correspondence with "data from the keyboard scan circuit 11", and in addition, "a set sound volume from a volume circuit for setting a volume" and "panel switch data from a panel scan circuit detecting operational states of various switches such as a power switch and a tone selection switch", in accordance with the above-described control program. The CPU 13 outputs a control signal based on the above computation result to a sound source circuit 16.

The sound source circuit 16 reads waveform data from a waveform memory 17 in accordance with a control signal from the CPU 13. The sound source circuit 16 multiplies the read waveform data by an envelope, to generate a digital musical sound signal MS, and outputs the musical sound signal MS. A DSP (digital signal processor) 18 carries out addition of a sound effect such as reverberation and chorus and a filtering processing to the musical sound signal MS. A D/A (digital/analog convertor) 19 converts the musical sound signal MS subjected to addition of the sound effect and the filtering processing into an analogy signal, and sends to a speaker 20. The musical sound signal MS having been converted into the analog signal is reproduced in a speaker 20 and sounded.

Figure 3:
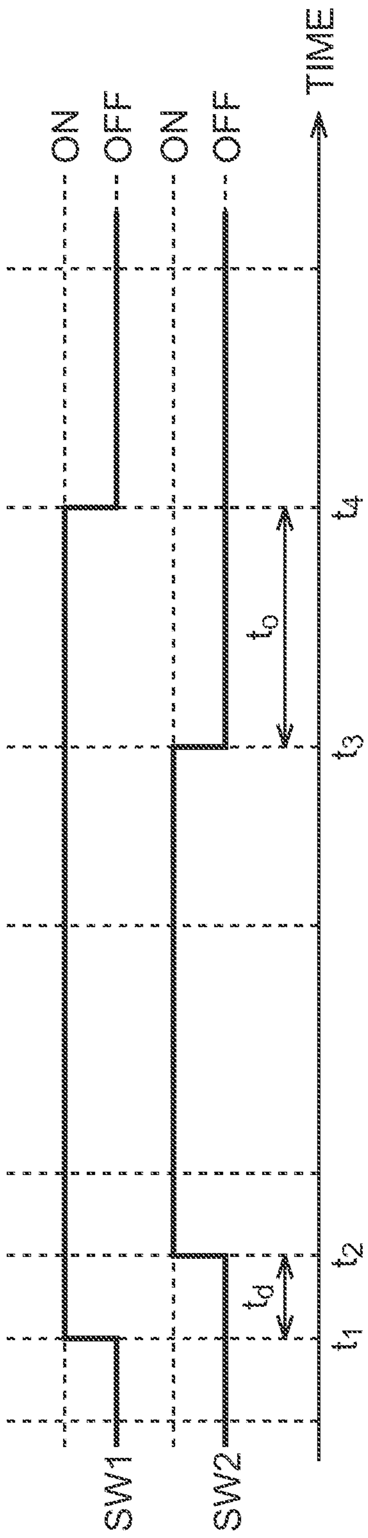
FIG. 3 shows an embodiment of the present invention, and is a diagram showing an example of a key depression speed detection period and a key release speed detection period.

FIG. 3 indicates that the key switch SW1 turns on at a time $t_1$, the key switch SW2 turns on at a time $t_2$, the key switch SW2 turns off at a time $t_3$, and the key switch SW1 turns off at a time $t_4$. A period from $t_1$ to $t_2$ is a key depression speed detection period $t_d$. A period from $t_3$ to $t_4$ is a key release speed detection period $t_o$.

By performing counting of key speed detection periods (the key depression speed detection period $t_d$ and the key release speed detection period $t_o$), a time during which a key moves in a zone between the key switches SW1, SW2 can be obtained. An inverse number of a value of the above is a key speed. However, in order to simplify computation, in general, the above counting is performed by using a down counter and a count value of the down counter is obtained as a qualitative key speed. Counting by the down counter starts from a maximum value and ends at "O". Note that as a count value of the down counter is larger the key speed is faster. Further, in general, the key release speed is faster than the key depression speed. Therefore, when a maximum value of the key release speed detection period $t_o$ and a maximum value of the key depression speed detection period $t_d$ are compared, the maximum value of the key release speed detection period $t_o$ is longer than the maximum value of the key depression speed detection period $t_d$.

First, by using FIG. 8, a method generally used for detecting a key depression speed and a key release speed will be described.

Figure 8:
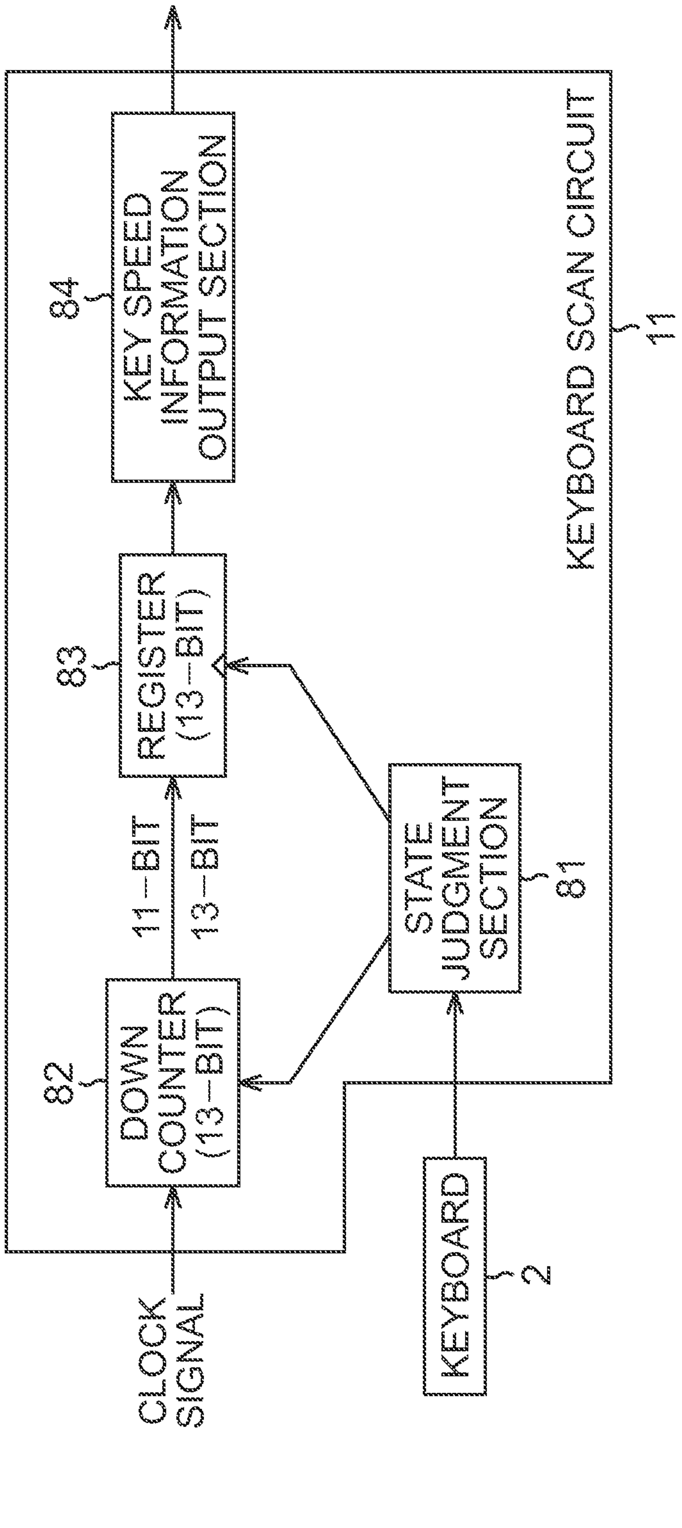
FIG. 8 is a block diagram showing an example of a configuration of a general keyboard scan circuit.

In FIG. 8, at a key speed counting start time, a state judgment section 81 sets an initial value to a down counter 82 and instructs start of counting of a key speed. When counting of the key speed starts, a count value (cumulative value) of the down counter 82 is stored in a register 83. The state judgment section 81 instructs outputting of a stored value (the count value of the down counter 82) of the register 83 at a time that counting of the key speed ends to a key speed information output section 84. The key speed is determined based on the stored value (the count value of the down counter 82) of the register 83 at that time. In an example shown in FIG. 8, counting is carried out as above, similarly both at the key depression time and the key release time. Compared with a dynamic range of the down counter 82 at the time of detection of the key depression speed, a dynamic range of the down counter 82 at the time of detection of the key release speed is larger. FIG. 8 shows an example in which the dynamic range at the time of detection of the key depression speed is 11-bit and the dynamic range at the time of detection of the key release speed is 13-bit. The reason why the dynamic range at the time of detection of the key release speed is larger than the dynamic range at the time of detection of the key depression speed is that the periods during which the key switches SW1, SW2 operate are longer at the key release time than at the key depression time. It is preferable that an initial value at the key speed counting start time is 0x1FFF (maximum value of 13 bits) being a maximum value of the down counter 82.

As described above, if the key speeds are detected uniformly at the key depression time and at the key release time, a number of digits of data stored in the register 83 when the key release speed is detected becomes large, and thus a circuit scale becomes large. Parts whose circuit scales become large are three, i.e., the down counter 82, the register 83, and a key speed information output section 84.

Hereinafter, first to fifth embodiments of the present invention will be described. Note that in description of the first to fifth embodiments, detailed explanation of a part same as the part already described will be omitted.

(First Embodiment)

First, a first embodiment of the present invention will be described with reference to FIG. 4.

Figure 4:
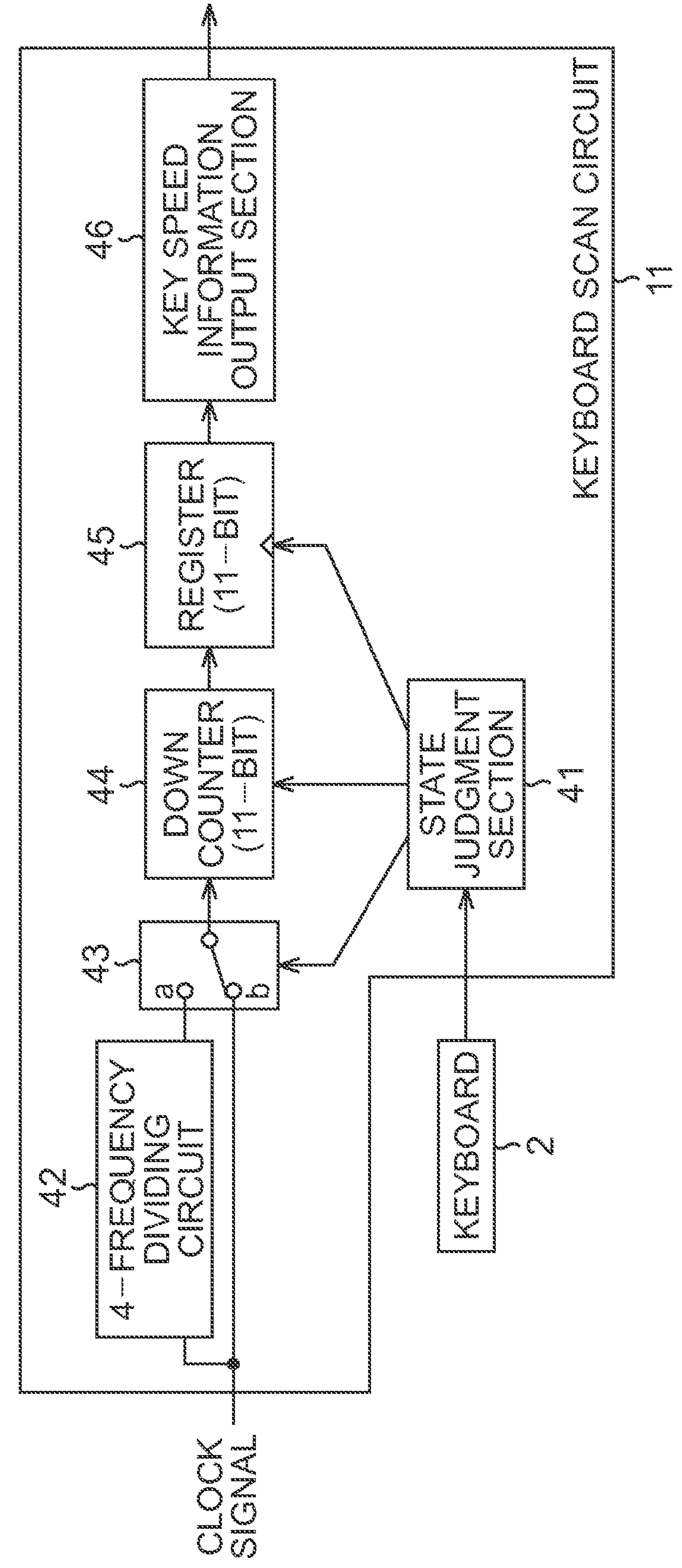
FIG. 4 shows a first embodiment of the present invention, and is a block diagram showing an example of a configuration of a keyboard scan circuit.

FIG. 4 is a diagram showing an example of a configuration of hardware of a keyboard scan circuit 11. In FIG. 4, a reference numeral 41 indicates a state judgment section, a reference numeral 42 indicates a 4-frequency dividing circuit, a reference numeral 43 indicates a switching circuit, a reference numeral 44 indicates a down counter, a reference numeral 45 indicates a register, and a reference numeral 46 indicates a key speed information output section.

In order to eliminate a disadvantage in a technique described with reference to FIG. 8, in the first embodiment, there are used two kinds of clock signals of the clock signal as it is which has been inputted to the keyboard scan circuit 11 and the clock signal obtained by frequency-dividing that clock signal by 4 in the 4-frequency dividing circuit 42. The clock signal frequency-divided by 4 is supplied to a first fixed terminal a of the switching circuit 43. On the other hand, the clock signal not frequency-divided is supplied to a second fixed terminal b.

The state judgment section 41 judges a state of a keyboard 2. As a result of this judgment, if a key is being depressed, the state judgment section 41 switches a movable terminal to a second fixed terminal b side. On the other hand, if the key is being released, the state judgment section 41 switches the movable terminal to a first fixed terminal a side. The state judgment section 41, when starting counting of a key speed, sets an initial value to the down counter 44 and instructs starting of counting of the key speed. When counting of the key speed starts, a count value (cumulative value) of the down counter 44 is stored in the register 45. The state judgment section 41 instructs outputting of a stored value (the count value of the down counter 44) of the register 45 at a time that counting of the key speed ends to the key speed information output section 46. The key speed is determined based on the stored value (the count value of the down counter 44) of the register 45 at that time.

For example, it is set that a clock frequency=10 kHz and a clock signal of this clock frequency is frequency-divided by 4 to prepare a signal of 2.5 kHz. The state judgment section 41 judges whether an operation of the key is key depression or key release from the state of the keyboard 2. The state judgment section 41, in correspondence with a result of the judgment, switches a terminal to which the signal is inputted to either one of the first fixed terminal a and the second fixed terminal b. As a result of the above, a count speed in the down counter 44 at a time of detection of the key release speed can be delayed than a count speed in the down counter 44 at a time of detection of the key depression speed. In other words, it is possible to lessen the number of times of counting per a unit time by the down counter 44 at the time of detection of the key release speed than the number of times of counting per a unit time by the down counter 44 at the time of detection of the key depression speed. Therefore, it is possible to minify the dynamic range of the down counter 44 at the time of detection of the key release speed. Concretely, the dynamic range of the down counter 44 at the time of detection of the key release speed can be made the same as the dynamic range of the down counter 44 at the time of detection of the key depression speed. Thereby, it is possible to make a number of digits of data indicating the key depression speed and a number of digits of data indicating the key release speed which are stored in the register 45 the same. As a result, it is possible to minify circuit scales of the down counter 44, the register 45, and the key speed information output section 46. It is preferable that an initial value at a key speed counting start time is 0x7FF (maximum value of 11 bits) being a maximum value of the counter.

The key speed information output section 46 outputs a count value of the down counter 44 at a time that counting of the key speed ends to the CPU 13 as data indicating a qualitative key speed (data indicating the key release speed and data indicating the key depression speed). As described above, the dynamic range of the down counter 44 at the time of detection of the key release speed is smaller than the dynamic range of the down counter 83 shown in FIG. 8. Therefore, the circuit scale of the key speed information output section 46 is also smaller than a circuit scale of the key speed information output section 84 shown in FIG. 8. Note that the data indicating the key release speed and the data indicating the key depression speed are data whose unit is a bit.

The CPU 13 controls at least either one of a volume and a tone of a musical sound to generate, in correspondence with data indicating the qualitative key speed, the data outputted from the key speed information output section 46. As described above, a count speed in the down counter 44 at the time of detection of the key release speed is delayed than a count speed in the down counter 44 at the time of detection of the key depression speed. Therefore, the CPU 13 cannot make easy comparison between the key depression speed and the key release speed. However, in controlling the volume and the tone of the musical sound to generate, comparison between the key depression speed and the key release speed is not necessarily required, as long as a relative relationship between the key depression speeds can be reflected in a musical sound of a key depression time and a relative relationship between the key release speeds can be reflected in a musical sound of a key release time. Therefore, even when a processing is done as in the present embodiment, a load of a processing in the CPU 13 in computing a content of a musical sound to generate is not increased significantly. Further, a resolution of the key release speed becomes lower compared with a resolution of the key depression speed. However, in computing the content of the musical sound to generate, a highly accurate key release speed is unnecessary, and it suffices if a rough key release speed can be obtained. Therefore, a fact that the resolution of the key release speed becomes lower compared with the resolution of the key depression speed does not influence the processing significantly.

As describe above, in the present embodiment, a key depression/release speed can also be detected by a circuit scale as small as required for detection of a key depression speed only.

(Second Embodiment)

Figure 5:
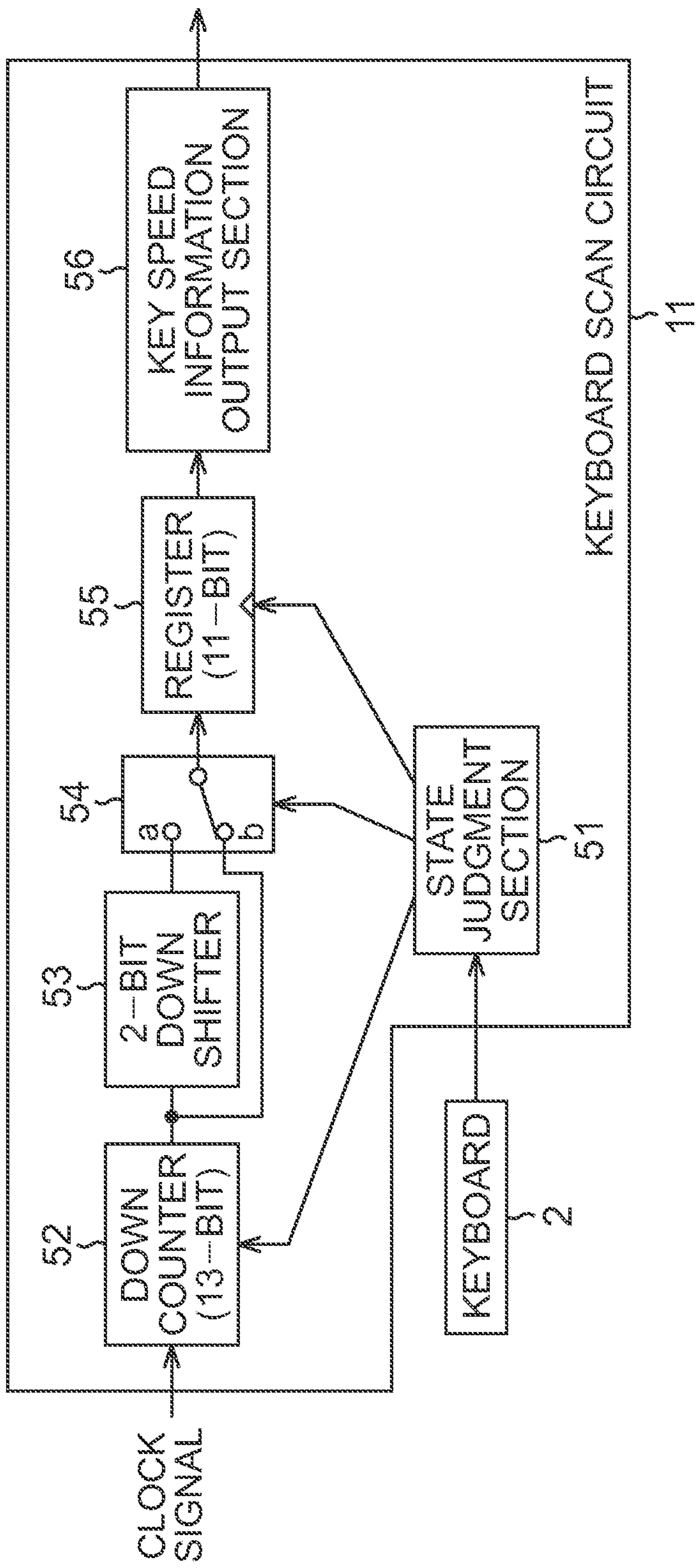
FIG. 5 shows a second embodiment of the present invention, and is a block diagram showing an example of a configuration of a keyboard scan circuit.

Next, a second embodiment will be described with reference to FIG. 5. FIG. 5 is a diagram showing an example of a configuration of hardware of a keyboard scan circuit 11. The keyboard scan circuit 11 of the second embodiment has a state judgment section 51, a down counter 52, a 2-bit down shifter 53, a switching circuit 54, a register 55, and a key speed information output section 56.

In the second embodiment, in order to obtain an effect the same as that in the first embodiment, a method for retrieving speed information from a count value of the down counter 52 is made different from that of the first embodiment. In the example of FIG. 5, the count value of the down counter 52 is supplied to a first fixed terminal a of the switching circuit 54 via the 2-bit down shifter 53. On the other hand, to a second fixed terminal b, the count value of the down counter 52 is supplied directly.

Similarly to in the first embodiment, the state judgment section 51 judges a state of a keyboard 2. As a result of this judgment, if a key is being depressed, the state judgment section 51 switches a movable terminal to a second fixed terminal b side. On the other hand, if the key is being released, the state judgment section 51 switches the movable terminal to a first fixed terminal a side.

In the present embodiment, at a time of detection of a key depression speed, lower 11 bits of the count value of the down counter 52 are retrieved from the second fixed terminal b and stored in the register 55. On the other hand, at a time of detection of a key release speed, upper 11 bits of the count value of the down counter 52 are retrieved from the first fixed terminal a by the 2-bit down shifter 53 and stored in the register 55. As a result of the above, similarly to in the first embodiment, dynamic ranges of the register 55 and the key speed information output section 56 can be suppressed to be small. Concretely, it is possible to make a number of digits of data indicating the key depression speed and a number of digits of data indicating the key release speed stored in the register 55 the same. As a result, it is possible to minify circuit scales of the register 55 and the key speed information output section 56. It is preferable that an initial value at a key speed counting start time is 0x1FFF being a maximum value of the counter.

The key speed information output section 56 outputs the count values of the down counter 53 as qualitative key speeds (a key release speed and a key depression speed) to the CPU 13, as above.

The CPU 13 controls at least either one of a volume and a tone of a musical sound to generate, in correspondence with the qualitative key speed outputted from the key speed information output section 56. As described above, at the time of detection of the key depression speed, lower 11 bits of the count value of the down counter 52 are retrieved. On the other hand, at the time of detection of the key release speed, upper 11 bits of the count value of the down counter 52 are retrieved and lower 2 bits are discarded. Therefore, the CPU 13 cannot make easy comparison between the key depression speed and the key release speed in the present embodiment, either. Further, a resolution of the key release speed becomes lower compared with a resolution of the key depression speed. However, as described in the first embodiment, the above does not influence the processing significantly.

(Third Embodiment)

Figure 6:
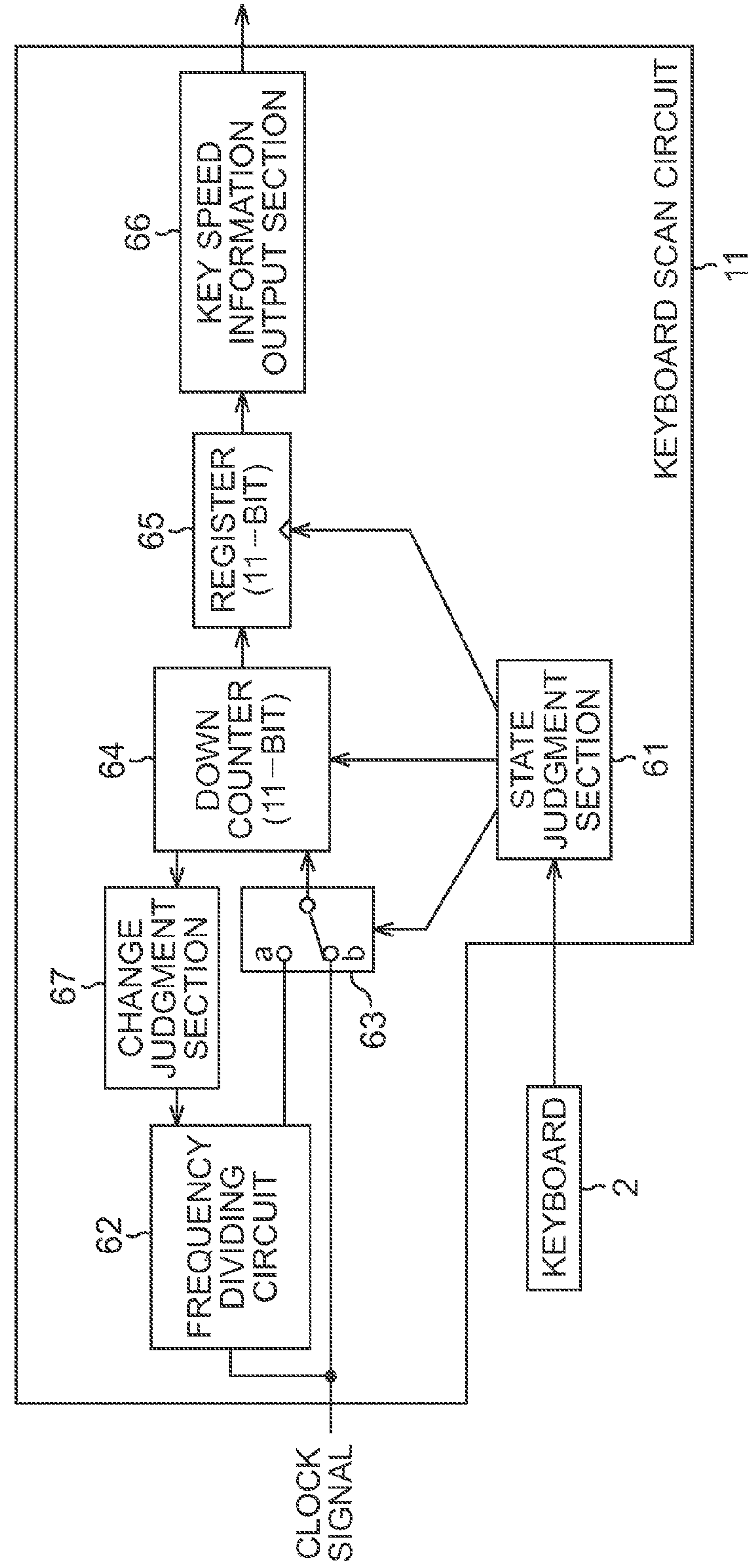
FIG. 6 shows a third embodiment of the present invention, and is a block diagram showing an example of a configuration of a keyboard scan circuit.

Next, a third embodiment will be described with reference to FIG. 6. FIG. 6 is a diagram showing an example of a configuration of hardware of a keyboard scan circuit 11. The keyboard scan circuit 11 of the third embodiment has a state judgment section 61, a frequency dividing circuit 62, a switching circuit 63, a down counter 64, a register 65, a key speed information output section 66, and a change judgment section 67.

The keyboard scan circuit 11 of the third embodiment has the frequency dividing circuit 62 and the change judgment section 67 instead of the 4-frequency dividing circuit 42 of the first embodiment. The other configuration of the third embodiment is the same as that of the first embodiment.

Similarly to in the first embodiment, the state judgment section 61 judges a state of a keyboard 2. As a result of this judgment, if a key is being depressed, the state judgment section 61 switches a movable terminal to a second fixed terminal b side. On the other hand, if the key is being released, the state judgment section 61 switches the movable terminal to a first fixed terminal a side.

The change judgment section 67 monitors a count value of the down counter 64. The change judgment section 67 changes a frequency division ratio of the frequency dividing circuit 62 as the count value of the down counter 64 proceeds. For example, the change judgment section 67 sets the frequency division ratio of the frequency dividing circuit 62 at a first frequency division ratio until the count value of the down counter 64 becomes larger than a predetermined value. The change judgment section 67 changes the frequency division ratio of the frequency dividing circuit 62 to a second frequency division ratio larger than the first frequency division ratio when the count value of the down counter 64 becomes larger than the predetermined value. By setting a plurality of the predetermined values and frequency division ratios, respectively, change of the frequency division ratio can also be carried out in stages. For example, the frequency division ratio can be changed to double the present frequency division ratio, such as 4, 8, 16, 32, and so on, for example.

As is obvious from the above explanation, in the present embodiment, when the count value of the down counter 64 becomes the predetermined value, the frequency division ratio of the frequency dividing circuit 62 is made larger than the present value.

As a key release detection time becomes longer, a resolution of a key release speed can be lower. Thus, in the present embodiment, by making the frequency division ratio larger as the key release detection time becomes longer, a dynamic range of the down counter 64 at a time of detection of the key release speed can be made small when the key release detection time is long. Therefore, it is possible to obtain flexible dynamic ranges corresponding to detection results of various key release speeds. The other configuration of the present embodiment is the same as that of the first embodiment, and detailed explanation thereof will be omitted.

(Fourth Embodiment)

Figure 7:
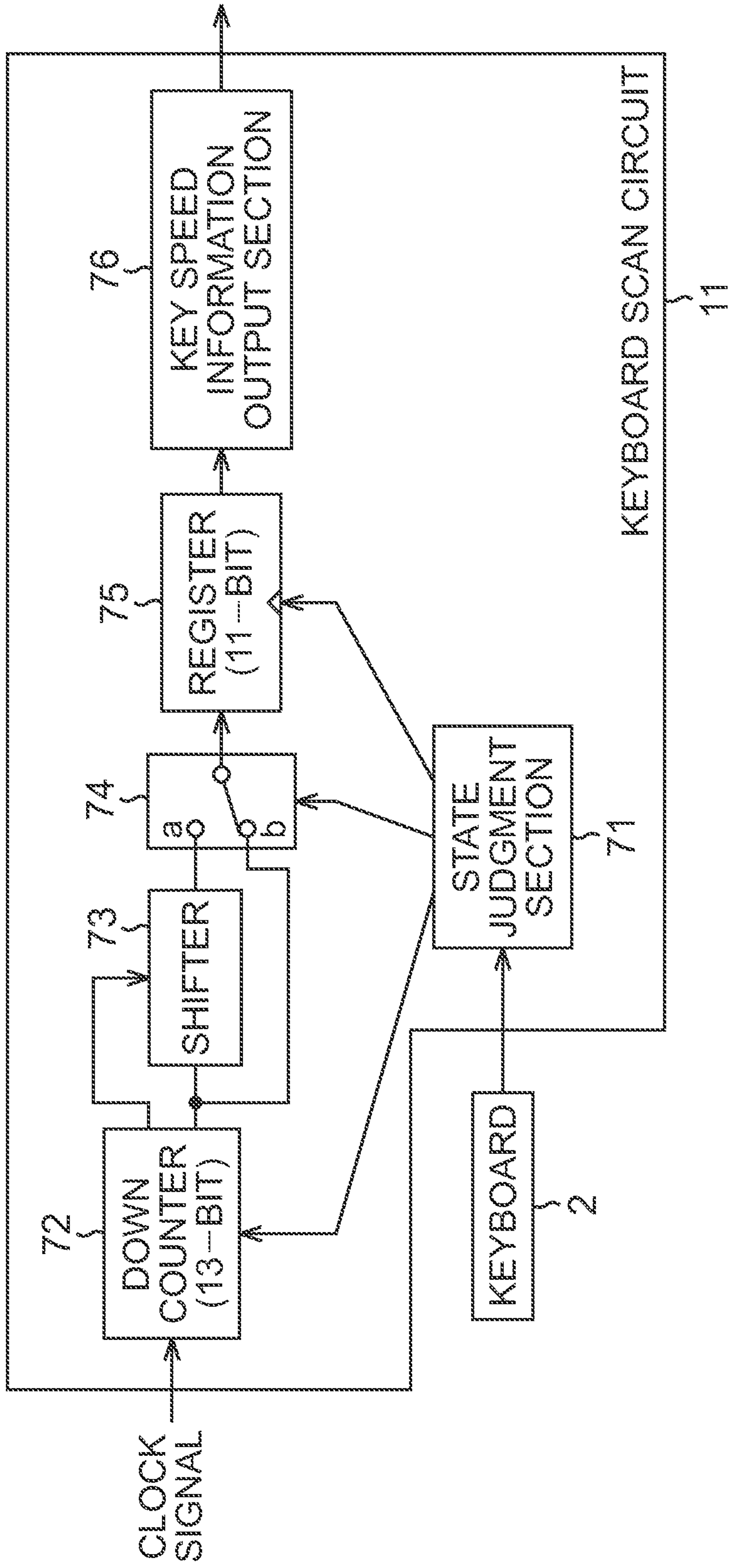
FIG. 7 shows a fourth embodiment of the present invention, and is a block diagram showing an example of a configuration of a keyboard scan circuit.

Next, a fourth embodiment will be described with reference to FIG. 7. FIG. 7 is a diagram showing an example of a configuration of hardware of a keyboard scan circuit 11. The keyboard scan circuit 11 of the fourth embodiment has a state judgment section 71, a down counter 72, a shifter 73, a switching circuit 74, a register 75, and a key speed information output section 76.

The keyboard scan circuit 11 of the fourth embodiment has the shifter 73 instead of the 2-bit down shifter 53 of the second embodiment, and has the down counter 72 to which a part of a function is added to the down counter 52.

Similarly to in the first embodiment, the state judgment section 71 judges a state of a keyboard 2. As a result of this judgment, if a key is being depressed, the state judgment section 71 switches a movable terminal to a second fixed terminal b side. On the other hand, if the key is being released, the state judgment section 71 switches the movable terminal to a first fixed terminal a side. The down counter 72 changes a shift amount of a clock signal in the shifter 73 as a count value of the down counter 72 proceeds. For example, the down counter 72 sets the shift amount of the clock signal in the shifter 73 at a first shift amount until the count value of the down counter 72 becomes larger than a predetermined value. The down counter 72 changes the shift amount of the clock signal in the shifter 73 to a second shift amount larger than the first shift amount when the count value of the down counter 72 becomes larger than the predetermined value. By setting a plurality of the predetermined values and shift amounts, respectively, change of the shift amount can also be carried out in stages.

"Upper x bits (x is a positive integer) of a clock signal" corresponding to the shift amount set as above are retrieved from a first fixed terminal a and stored in the register 75. Note that as the shift amount is larger, a value of x is smaller.

As is obvious from the above explanation, in the present embodiment, when the count value of the down counter 72 becomes the predetermined value, the shift amount of the clock signal in the shifter 73 is made larger than the present value.

As a Key release detection time is longer, a resolution of a key release speed can be lower. Thus, in the present embodiment, as the key release detection time becomes longer, the shift amount is made larger to make a number of digits of data retrieved from the down counter 72 smaller. Thereby, when the key release detection time is long, a dynamic range of the down counter 72 at a time of detection of the key release speed can be made small. Therefore, it is possible to obtain flexible dynamic ranges corresponding to detection results of various key release speeds. The other configuration of the present embodiment is the same as that of the second embodiment.

(Fifth Embodiment)

Next, a fifth embodiment will be described with reference to FIG. 9 and FIG. 10.

Figure 9:
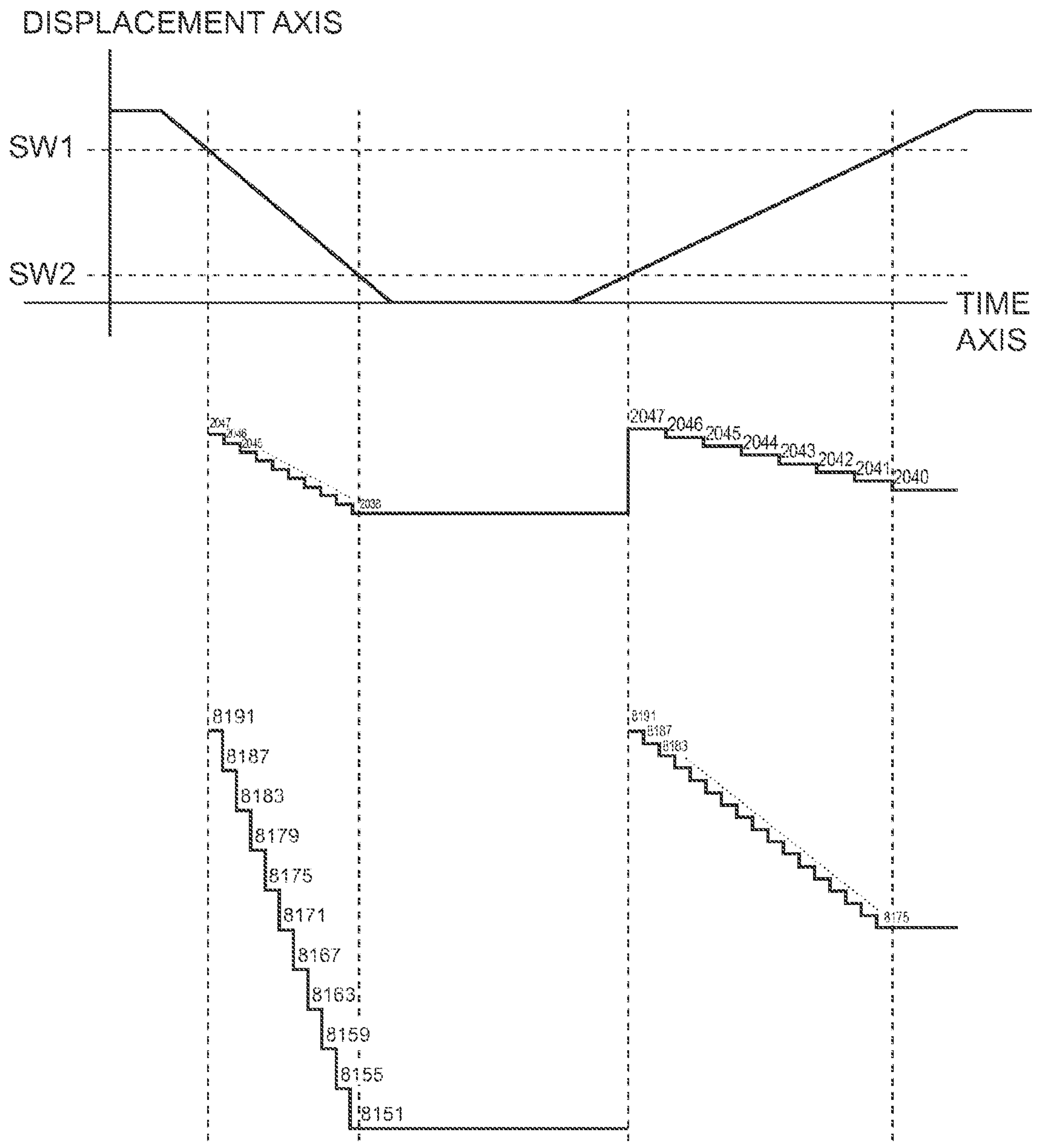
FIG. 9 is a diagram showing how keyboard speeds different at a key depression time and at a key release time are normalized.

FIG. 9 shows how key speeds different at a key depression time and at a key release time are normalized.

In a diagram in an upper stage of FIG. 9, a vertical axis indicates a displacement axis, while a horizontal axis indicates a time axis. The diagram in the upper stage of FIG. 9 shows a condition in which, when a keyboard 2 passes through between a key switch SW1 and a key switch SW2, at the key depression time the keyboard 2 passes through at a high speed and at the key release time the keyboard 2 passes through at a lower speed than at the key depression time.

A diagram in a middle stage of FIG. 9 shows a condition in which a count speed in a counter counting the key speed is changed at the key depression time and the key release time by changing a cycle (a clock frequency) of a clock signal. The diagram in the middle stage of FIG. 9 corresponds to the first embodiment shown in FIG. 4. When a piano performance is presumed, a cycle of a clock signal at the key release time is made about four times as long as a cycle of a clock signal at the key depression time, making the clock signal of the key release time tick more slowly. By the above, as described in the first embodiment, it is possible to minify circuit scales of the down counter 44, the register 45, and the key speed information output section 46. In the diagram of the middle stage of FIG. 9, a key depression speed is "2038" and a key release speed is "2040".

A diagram in a lower stage of FIG. 9 shows how a count value in a counter is weighted. The diagram in the lower stage of FIG. 9 corresponds to the present embodiment. In the present embodiment, even when clock signals are made to tick at the same clock frequency, a dynamic range is minified as a result that a count number in a counter is weighted.

Figure 10:
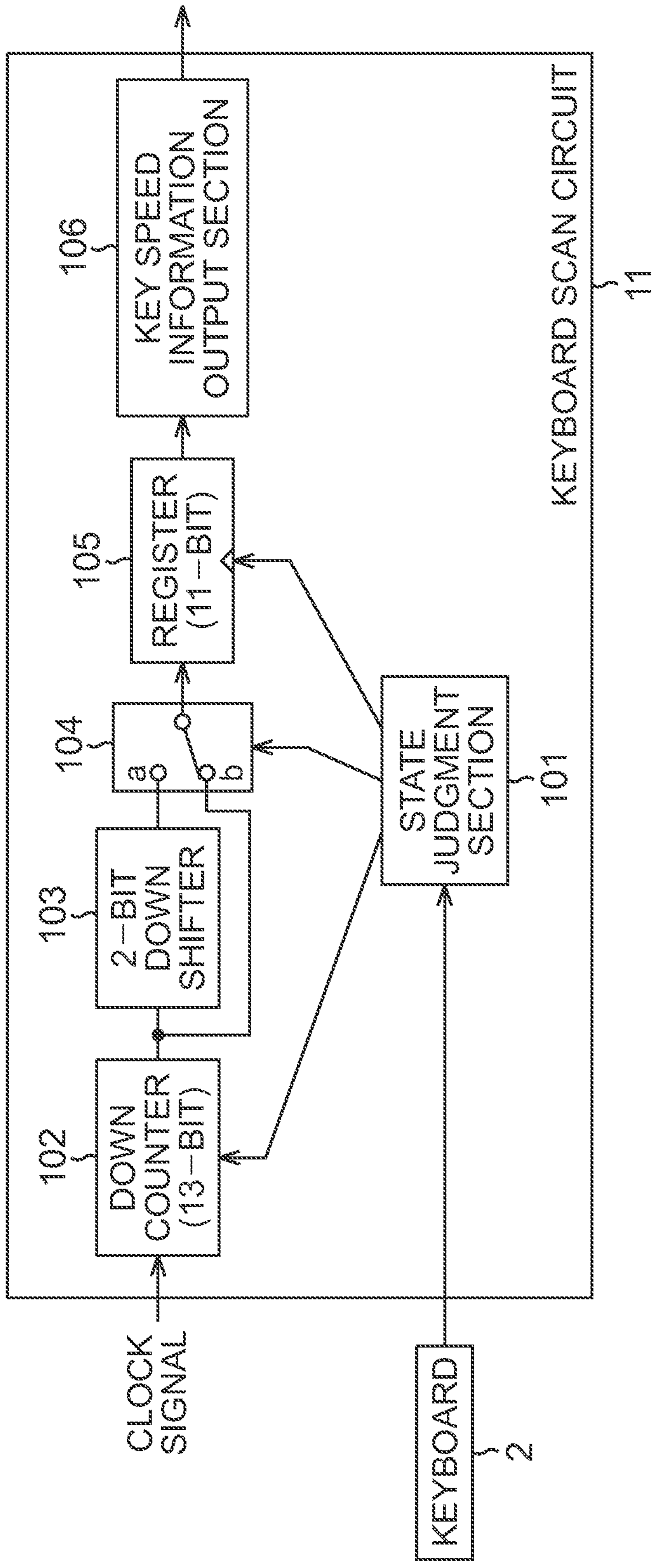
FIG. 10 shows a fifth embodiment of the present invention, and is a block diagram showing an example of a configuration of a keyboard scan circuit.

FIG. 10 is a diagram showing an example of a configuration of hardware of a keyboard scan circuit 11. The keyboard scan circuit 11 of the fifth embodiment has a state judgment section 101, a down counter 102, a 2-bit down shifter 103, a switching circuit 104, a register 105, and a key speed information output section 106.

Similarly to in the first embodiment, the state judgment section 101 judges a state of a keyboard 2. As a result of this judgment, if a key is being depressed, the state judgment section 101 switches a movable terminal to a second fixed terminal b side. On the other hand, if the key is being released, the state judgment section 101 switches the movable terminal to a first fixed terminal a side.

In the present embodiment, in order to perform aforementioned weighting, at a detection time of the key depression speed, the down counter 102 counts "1"every time a clock signal of n-cycle is inputted. On the other hand, at a detection time of key release speed, similarly to the down counters 44, 52, 64, 72 in the first to fourth embodiments, the down counter 102 counts "1"every time a clock signal of 1-cycle is inputted. Here, "n" indicates an integer of 2 or more, and "n" is 4 in the example shown in the lower diagram of FIG. 9. In the diagram in the lower stage of FIG. 9, the key depression speed is "2037 (=8151÷4)" and the key release speed is "2043 (=8175÷4)".

In the present embodiment, at detection time of the key depression speed, lower 11 bits of the count value of the down counter 102 are retrieved from the second fixed terminal b and stored in the register 105. On the other hand, at detection time of the key release speed, upper 11 bits of the count value of the down counter 102 are retrieved from the first fixed terminal a by the 2-bit down shifter 103 and stored in the register 105.

By this method, a dynamic range of the down counter 102 cannot be minified. However, by eliminating lower 2 bits at a time of storing and transmitting a result of counting by the down counter 102, the circuit scales of the register 105 and the key speed information output section 106 can be minified. Concretely, a number of digits of data indicating the key depression speed and a number of digits of data indicating the key release speed of data indicating the key release speed which are stored in the register 105 can be made the same. Note that it is explained in the first embodiment that a processing is not influenced significantly by the fact that easy comparison between the key depression speed and the key release speed cannot be made and the fact that the resolution of the key release speed becomes lower compared with the resolution of the key depression speed.

(Summary)

In the first to fifth embodiments, for example, by using the keyboard scan circuit 11, a key speed detection section is realized. However, also by the CPU 13 executing a program instead of the keyboard scan circuit 11, the key speed detection section can be realized.

Further, in the first embodiment, for example, by using the 4-frequency dividing circuit 42, a frequency division section is realized, and by using the down counter 44, a counter is realized. Further, in the third embodiment, for example, by using the frequency dividing circuit 62, a frequency dividing section is realized, and by using the down counter 64, a counter is realized.

Further, in the fifth embodiment, for example, by using the 2-bit down shifter 103, a data discarding section is realized, and by using the down counter 102, a counter is realized.

Further, in the second embodiment, for example, by using the 2-bit down shifter 53, a data discarding section is realized, and by using the down counter 52, a counter is realized. Further, in the fourth embodiment, for example, by using the shifter 73, a data discarding section is realized, and by using the down counter 72, a counter is realized.

Further, in the first to fifth embodiments, for example, by the CPU 13 executing the control program, a sound generation control section is realized.

Note that the embodiments of the present invention described hereinabove can be realized by a computer executing a program. Further, means for supplying the program to the computer, for example, a computer-readable storage medium such as a CD-ROM in which the program is stored or a transmission medium transmitting the program can be applied as an embodiment of the present invention. Further, a program product storing the program such as a computer-readable storage medium, can also be applied as an embodiment of the present invention. The above-described program, computer-readable storage medium, a transmission medium, and a program product are included in the scope of the present invention.

Further, the embodiments of the present invention described hereinabove are presented by way of examples only to realize the present invention, and are not intended to limit the scope of the invention. Indeed, the present invention can be implemented in a variety of forms without departing from the technical spirit or essential features of the invention.

Industrial Applicability

The present invention can be used in an electronic musical instrument having a keyboard which detects a key depression speed and a key release speed.

The invention claimed is:

1. An electronic keyboard instrument comprising:

a plurality of keys;

a plurality of key switches, at least two of said plurality of key switches provided per each of said plurality of keys;

a counter accumulating a value in correspondence with input of a signal in a period including at least respective periods of a key depression speed detection period being a period determined in correspondence with a timing at which said key is detected by said key switch corresponding to said key, the period being a period for detecting a key depression speed of said key, and a key release speed detection period being a period determined in correspondence with a timing at which said key is detected by said key switch corresponding to said key, the period being a period for detecting a key release speed of said key;

a key speed detection section performing detecting the key depression speed of said key based on a cumulative value of said counter in the key depression speed detection period and detecting the key release speed of said key based on a cumulative value of said counter in the key release speed detection period; and a sound generation control section controlling at least either one of a volume and a tone of a musical sound to generate, in correspondence with the key depression speed and the key release speed detected by said key speed detection section, wherein a maximum value of the key release speed detection period is longer than a maximum value of the key depression speed detection period, and wherein said key speed detection section makes a resolution of the key release speed lower than a resolution of the key depression speed so that a number of digits of data indicating the key depression speed, a unit of the data being a bit, and a number of digits of data indicating the key release speed, a unit of the data being a bit, become the same.

2. The electronic keyboard instrument according to claim 1, wherein said key speed detection section comprises:

a frequency dividing section frequency-dividing the signal;

said counter; and a register storing data indicating the cumulative value of said counter, and performs storing the data of the cumulative value of said counter in the key depression speed detection period, the data being data of the cumulative value of said counter for the signal not frequency-divided by said frequency dividing section, as the data indicating the key depression speed, in said register, and storing the data of the cumulative value of said counter in the key release speed detection period, the data being data of the cumulative value of said counter for the signal frequency-divided by said frequency dividing section, as the data indicating the key release speed, in said register, and wherein the number of digits of the data indicating the key depression speed and the number of digits of the data indicating the key release speed stored in said register are the same.

3. The electronic keyboard instrument according to claim 1, wherein said key speed detection section comprises:

said counter;

a data discarding section discarding a predetermined number of lower digits of data indicating the cumulative value of said counter, a unit of the data being a bit; and a register, wherein said counter accumulates a value every time the signal of n-cycle (n indicates an integer of 2 or more) is inputted in the key release speed detection period and accumulates a value every time the signal of 1-cycle is inputted in the key depression speed detection period, wherein said data discarding section discards, in detecting the key release speed, a predetermined number of lower digits of the data indicating the cumulative value of said counter in the key release speed detection period, a unit of the data being a bit, and does not discard, when detecting the key depression speed, the predetermined number of lower digits of the data indicating the cumulative value of said counter in the key depression speed detection period, a unit of the data being a bit, wherein said register performs storing the data indicating the cumulative value of said counter after the predetermined number of lower digits are discarded by said data discarding section as the data indicating the key release speed, and storing the data indicating the cumulative value of said counter in the key depression speed detection period as it is as the data indicating the key depression speed, and wherein the number of digits of the data indicating the key depression speed and the number of digits of the data indicating the key release speed stored in said register are the same.

4. The electronic keyboard instrument according to claim 1, wherein said key speed detection section comprises:

said counter;

a data discarding section discarding a predetermined number of lower digits of data indicating the cumulative value of said counter, a unit of the data being a bit; and a register, wherein said counter accumulates a value every time the signal is inputted once, wherein said data discarding section discards a predetermined number of lower digits of the data indicating the cumulative value of said counter in the key release speed detection period, a unit of the data being a bit, wherein said register performs storing the data indicating the cumulative value of said counter after the predetermined number of lower digits are discarded by said data discarding section as the data indicating the key release speed, and storing data of a predetermined number of lower digits among the data indicating the cumulative value of said counter in the key depression speed detection period as the data indicating the key depression speed, and wherein the number of digits of the data indicating the key depression speed and the number of digits of the data indicating the key release speed stored in said register are the same.

* * * * *